United States Patent
Lee

(10) Patent No.: US 9,756,251 B2
(45) Date of Patent: Sep. 5, 2017

(54) DIGITAL DEVICE AND METHOD OF CONTROLLING THEREFOR

(71) Applicant: LG ELECTRONICS INC., Seoul (KR)

(72) Inventor: Seungjun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 26 days.

(21) Appl. No.: 14/717,605

(22) Filed: May 20, 2015

(65) Prior Publication Data

US 2016/0191803 A1 Jun. 30, 2016

(30) Foreign Application Priority Data

Dec. 26, 2014 (KR) .................. 10-2014-0190793

(51) Int. Cl.
| | |
|---|---|
| H04W 4/12 | (2009.01) |
| G02B 27/01 | (2006.01) |
| H04N 5/232 | (2006.01) |
| G06F 3/01 | (2006.01) |
| G06F 3/041 | (2006.01) |

(52) U.S. Cl.
CPC ....... H04N 5/23293 (2013.01); G02B 27/017 (2013.01); G06F 3/013 (2013.01); G06F 3/041 (2013.01); H04N 5/23203 (2013.01); H04N 5/23216 (2013.01); H04W 4/12 (2013.01); G02B 2027/0138 (2013.01)

(58) Field of Classification Search
CPC ............... H04N 5/232; H04N 2101/00; H04N 2201/0084; H04N 5/23248; H04N 5/772
See application file for complete search history.

(56) References Cited

U.S. PATENT DOCUMENTS

| | | | |
|---|---|---|---|
| 2012/0019645 A1 | 1/2012 | Maltz | |
| 2012/0019662 A1* | 1/2012 | Maltz | ........... G06F 3/013 348/158 |
| 2012/0302289 A1 | 11/2012 | Kang | |
| 2013/0017789 A1 | 1/2013 | Chi et al. | |
| 2014/0049452 A1* | 2/2014 | Maltz | ........... G06F 3/013 345/8 |
| 2014/0375834 A1* | 12/2014 | Lohan | ......... G06Q 10/101 348/211.99 |

FOREIGN PATENT DOCUMENTS

| | | |
|---|---|---|
| JP | 2008-59511 A | 3/2008 |
| KR | 10-2014-0130330 A | 11/2014 |

* cited by examiner

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

A digital device configured to attach a multimedia to a message and a method of controlling therefore is disclosed. The digital device according to the present specification can attach an image using a wearable device based on a user input inputted on the digital device or the wearable device in the middle of writing a message.

18 Claims, 10 Drawing Sheets

FIG. 8
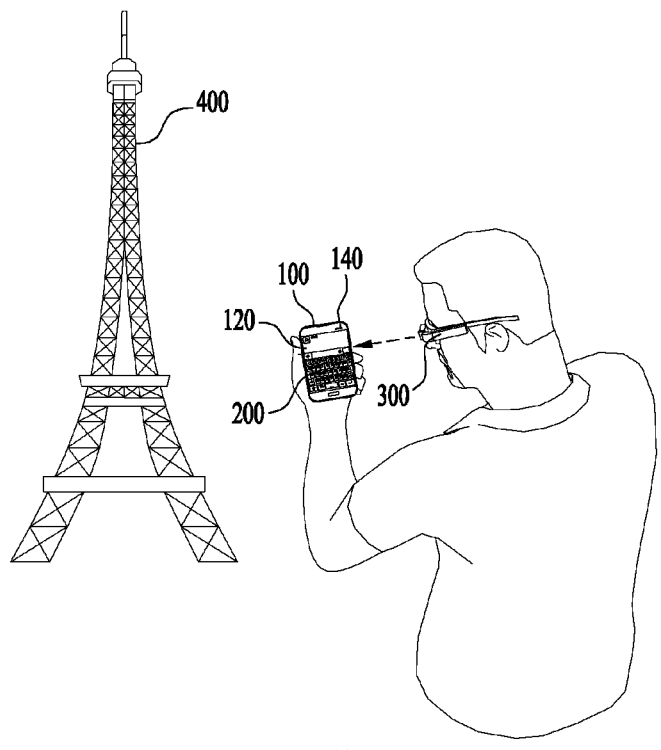
(a)
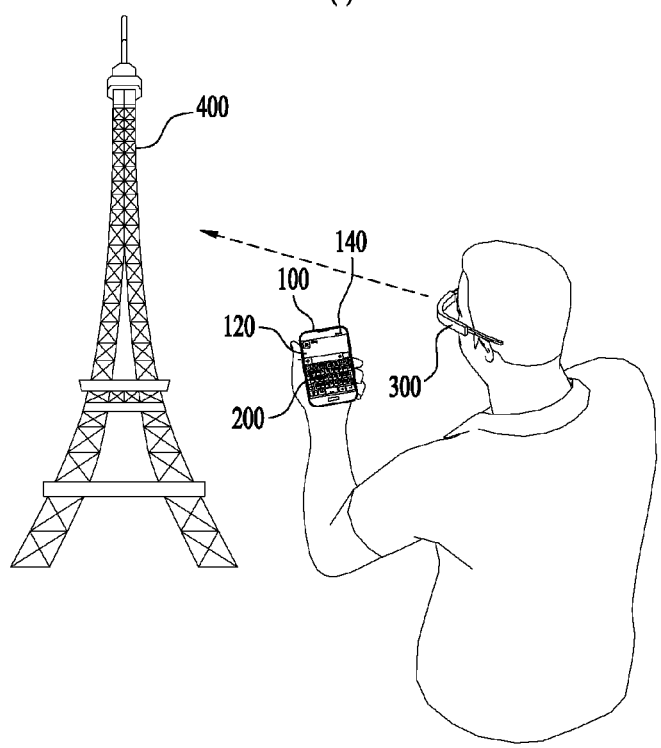
(b)

FIG. 9
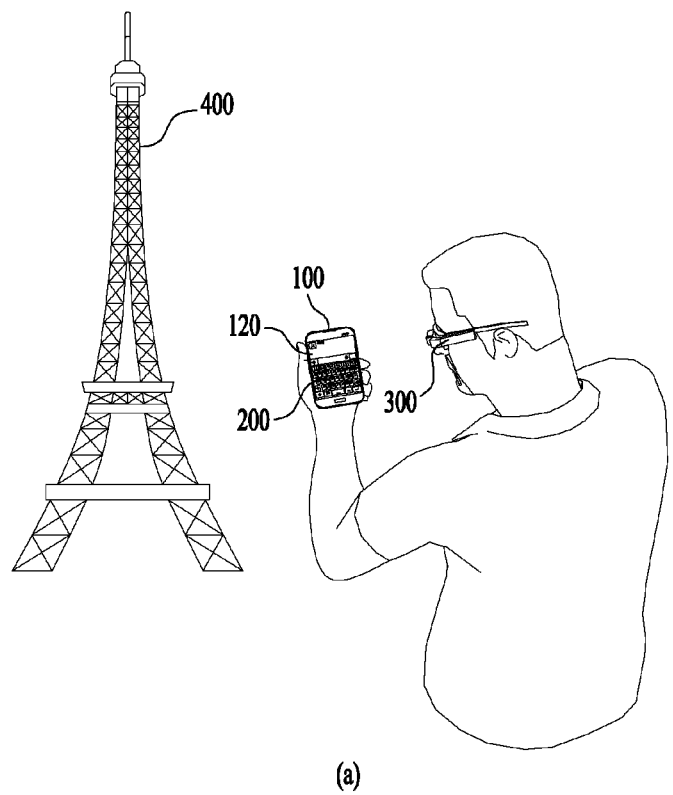
(a)
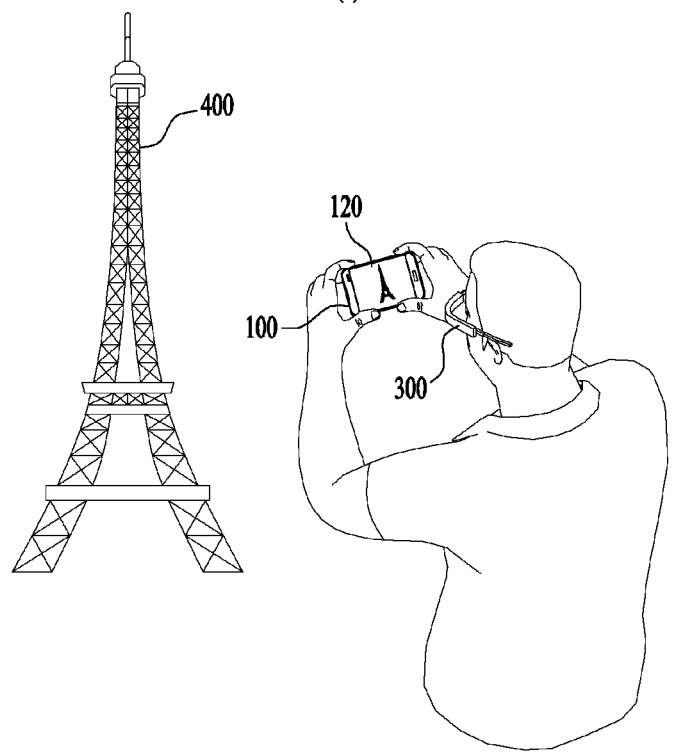
(b)

DIGITAL DEVICE AND METHOD OF CONTROLLING THEREFOR

This application claims the benefit of the Korean Patent Application No. 10-2014-0190793, filed on Dec. 26, 2014, which is hereby incorporated by reference as if fully set forth herein.

BACKGROUND OF THE INVENTION

Field of the Invention

The present specification relates to a digital device and a method of controlling therefor.

Discussion of the Related Art

FIG. 1 is a diagram for a legacy method of attaching a picture to a message in the middle of transmitting the message.

Referring to FIG. 1, a user is writing a message using a digital device 100. The user may want to transmit a surrounding picture together with the message in a manner of attaching the picture to the message. For instance, the user may want to transmit a picture of a landmark 400 positioned in the vicinity of the user together with the message.

According to the legacy method, in order for a user to attach a picture to a message, the user pushes an attachment button and selects a camera or a previously captured picture. When the user selects the camera, a camera application is executed. The user captures a picture using the camera application and can attach the captured picture to the message.

Yet, the user should stop writing the message being created to attach the picture to the message and execute the camera application. Hence, attaching the picture hinders the user from writing the message. Moreover, the user should undergo complex processes to attach the picture to the message.

Hence, it is required to have a method of easily and promptly attaching a picture.

SUMMARY OF THE INVENTION

Accordingly, the present specification is directed to an apparatus and method thereof that substantially obviate one or more problems due to limitations and disadvantages of the related art. The present specification intends to provide a digital device configured to attach a multimedia to a message being created using a more intuitive user interface and a method of controlling therefor. In particular, the present specification intends to provide a method of attaching a multimedia not hindering a user from writing a message by generating multimedia contents using a wearable device worn on the user of the digital device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a digital device includes a display unit configured to display an image and receive a touch input, a communication unit configured to communicate with a wearable device, an image sensing unit and a processor configured to control the display unit, the communication unit and the image sensing unit, the processor, if a message input interface for writing a message is displayed on the display unit, the message input interface includes a first attachment button and an input is inputted on the first attachment button, further configured to make the wearable device to capture an image, the processor further configured to attach the image captured by the wearable device to the message.

To further achieve these objects and other advantages and in accordance with the purpose of the invention, as embodied and broadly described herein, according to one embodiment, a method of controlling a digital device includes the steps of displaying a message input interface for writing a message on a display unit of the digital device, wherein the message input interface includes a first attachment button, if an input inputted on the first attachment button is received, making a wearable device communicating with the digital device to capture an image and attaching the image captured by the wearable device to the message.

According to the present specification, a digital device enables a user to more easily attach a picture to a message.

According to the present specification, a digital device can more promptly perform picture attachment and message transmission using a wearable device worn on a user.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a diagram for one embodiment of attaching a multimedia based on gaze recognition;

FIG. 9 is a diagram for one embodiment of attaching a multimedia based on a position of a digital device;

DETAILED DESCRIPTION OF THE INVENTION

Reference will now be made in detail to the preferred embodiments of the present specification, examples of which are illustrated in the accompanying drawings. While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

A digital device according to the present specification can include a different portable device including a camera, a cellular phone, a wireless communication telephone, a smartphone, a tablet PC, a PDA (personal digital assistant) and a display.

And, a wearable device according to the present specification can include a HMD (head mounted display), a smart watch and the like.

Figure 2:
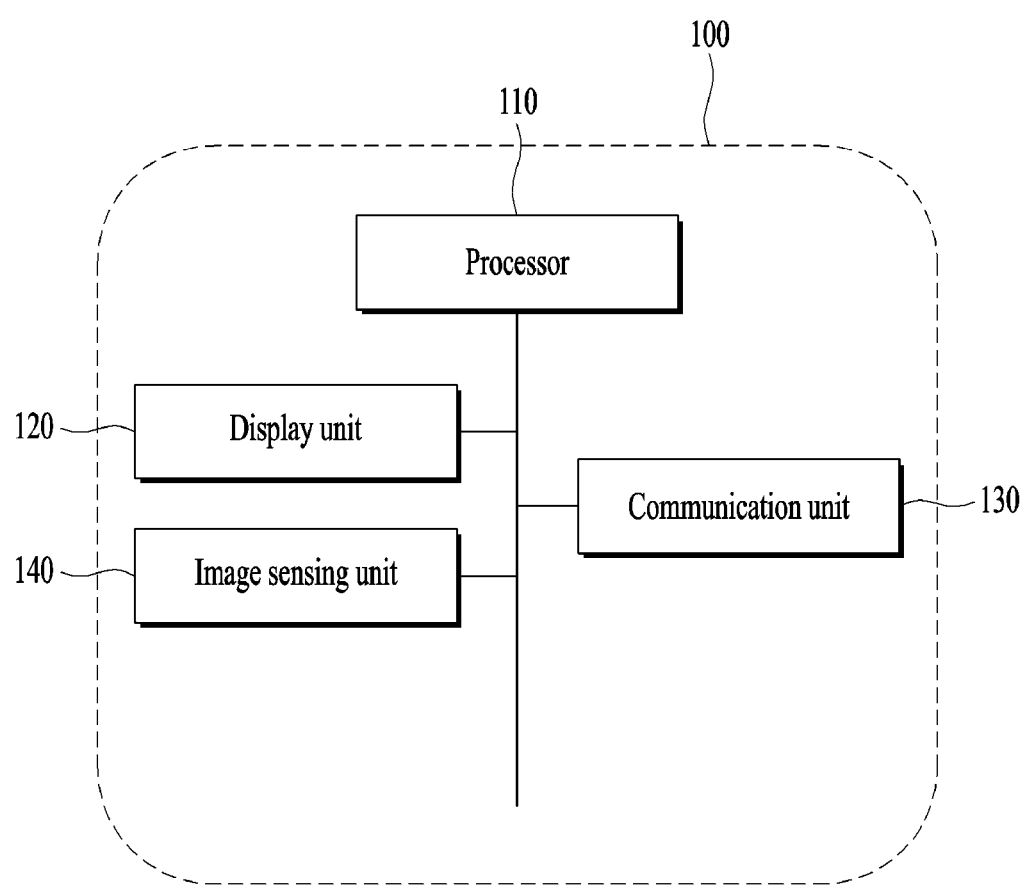
FIG. 2 is a block diagram for a digital device according to one embodiment.

FIG. 2 is a block diagram for a digital device according to one embodiment.

A digital device 100 may include a display unit 120, a communication unit 130, an image sensing unit 140 and a processor 110.

Figure 1:
FIG. 1 is a diagram for a legacy method of attaching a picture to a message in the middle of transmitting the message.

The display unit 120 displays one or more images and can receive a touch input. And, the display unit 120 can include a main display area and a sub display area. As mentioned earlier with reference to FIG. 1, the sub display area may correspond to an edge display. The display unit 120 can include a LCD (liquid crystal display), a plasma display or a display of a different form. And, the display unit 120 can include a flexible display, a rollable display and/or a foldable display. And, the display unit 120 may include a touch sensor. In particular, the display unit 120 may include a touch sensor. The touch sensor can be positioned on the display unit 120 or in the display unit 120. The touch sensor can sense contact or non-contact various touch inputs including a sliding touch input, a multi touch input, a long-press touch input, a short-press touch input, a drag touch input, a hovering input, a flicking touch input and the like. Moreover, the touch sensor can sense a touch input inputted by various input tools including a touch pen, a stylus pen and the like. The touch sensor can deliver a result of sensing a touch input to the processor 110.

The digital device 100 may include a communication unit 130. The communication unit 130 can communicate with an external device. The communication unit 130 can receive information from one or more external devices. The communication unit 130 performs communication via a wired network or a wireless network based on various protocols and can transmit/receive data. For instance, in order for the communication unit 130 to access an external device and/or a wireless network, the communication unit may use WLAN (wireless LAN), wireless LAN communication based on IEEE 802.11, Wibro (wireless broadband), Wimax (world interoperability for microwave access), HSDPA (high speed downlink packet access), Bluetooth, NFC (near field communication) standard or the like. And, the communication unit 130 can access the internet via a wired/wireless network.

And, the digital device 100 can be paired with an external device using the communication unit 130. For instance, the external device and the communication unit 130 can communicate with each other based on a predetermined protocol. And, the digital device 100 can transmit a signal to the external device based on an operation of the digital device 100 and the transmitted signal may enable the external device to perform a predetermined operation. And, an operation of the external device may enable a signal to be transmitted to the digital device 100 and the signal received from the external device may enable the digital device 100 to perform a predetermined operation. For instance, signal transmission and reception and performance of the predetermined operation may be explained as an interrupt. Hence, an interrupt occurs on the external device based on a signal received from the digital device 100 and the external device may perform a predetermined operation based on the interrupt. On the contrary, an interrupt occurs on the digital device 100 based on a signal received from the external device and the digital device 100 may perform a predetermined operation based on the interrupt.

The digital device 100 may include an image sensing unit 140. The image sensing unit 140 may include one or more cameras. A camera included in the image sensing unit 140 can be installed in a front side and/or a rear side of the digital device 100. The image sensing unit 140 can sense an image using infrared, ultraviolet and/or infrared.

The processor 110 can control the display unit 120, the communication unit 130 and the image sensing unit 140. The processor 110 can execute various applications by processing data of the digital device 100. The processor 110 can control the digital device 100 and contents executed in the digital device 100 based on a command.

Meanwhile, a composition diagram of the digital device shown in FIG. 2 corresponds to a block diagram according to one embodiment of the present specification. Blocks, which are represented in a manner of being divided, show hardware configuration units of the digital device 100 logically divided from each other. Hence, the aforementioned configuration units of the digital device 100 can be implemented by a single chip or a plurality of chips according to a design of the digital device 100.

Figure 3:
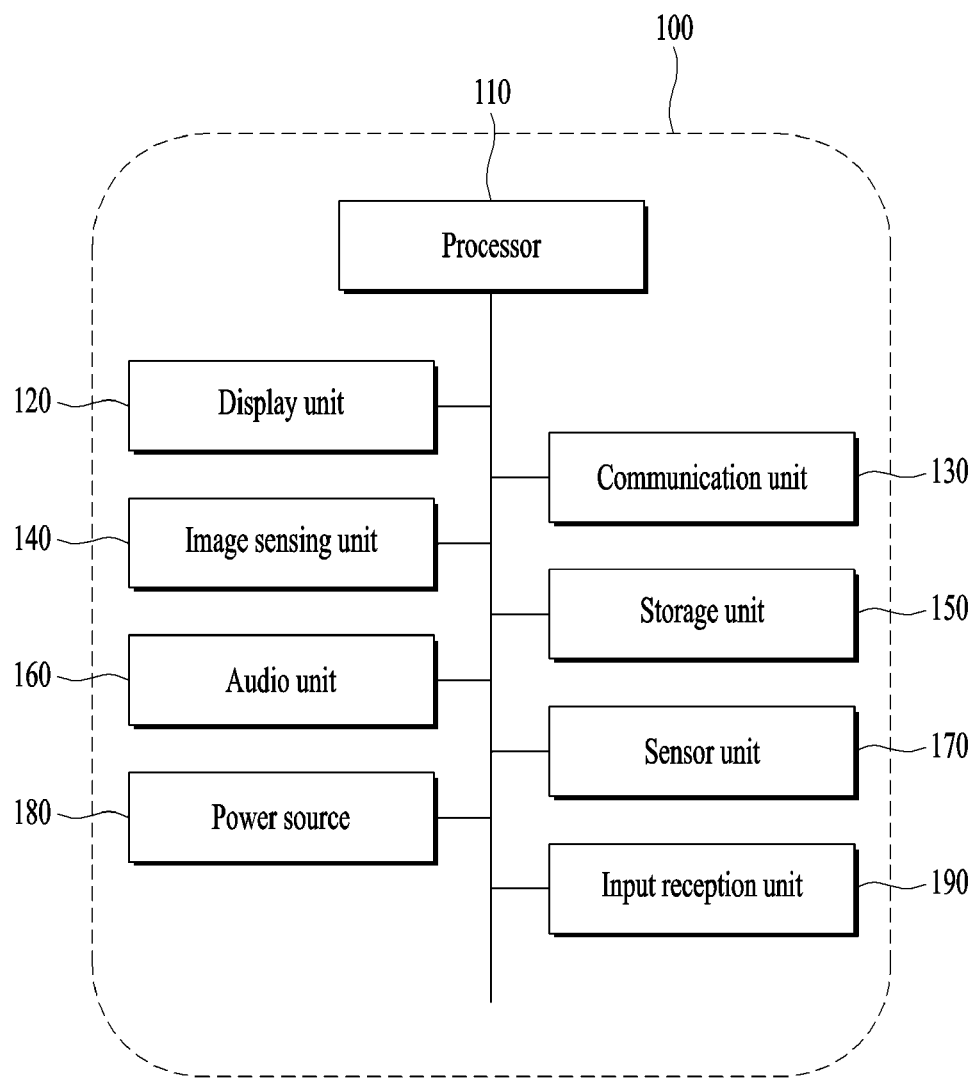
FIG. 3 is an additional block diagram for a digital device according to one embodiment.

FIG. 3 is an additional block diagram for a digital device according to one embodiment.

Meanwhile, a digital device 100 may further include components not depicted in FIG. 2. In the following, for clarity, explanation on overlapped components may refer to the description mentioned earlier with reference to FIG. 2.

A digital device 100 can include a storage unit 150. The storage unit 150 can be implemented by a chip or a plurality of chips. The storage unit can store an application data, a multimedia data, a system data and the like. And, the processor 110 can control the digital device 100 using a data stored in the storage unit 150. The storage unit 150 may correspond to one of various digital information storage spaces including a flash memory, a RAM (random access memory), an SSD (solid state drive) and the like.

The digital device 100 may include an audio unit 160. The digital device 100 may provide auditory feedback via the audio unit 160. The audio unit 160 may include one or more speakers.

The digital device 100 may include a sensor unit 170. The sensor unit 170 may include a GPS sensor, an image sensor, an infrared sensor, a motion sensor, a heartbeat sensor, a fingerprint sensor, a sound sensor, a touch sensor and/or a gyro sensor for example. And, the digital device 100 may sense context information of the digital device 100 based on a signal received from the sensor unit 170.

The digital device 100 may include power source 180. The power source 180 may include a disposable battery, a rechargeable battery and/or an energy storing means. Or, an external power source may supply power to the digital device 100.

The digital device 100 may include an input reception unit 190. The input reception unit 190 may sense a touch input, a voice input, a motion input and the like. And, the input reception unit 190 may include a physical button.

Meanwhile, a composition diagram of the digital device 100 shown in FIG. 3 corresponds to a block diagram according to one embodiment of the present specification. Blocks, which are represented in a manner of being divided, show hardware configuration units of the digital device 100 logically divided from each other. Hence, the aforementioned configuration units of the digital device 100 can be implemented by a single chip or a plurality of chips according to a design of the digital device 100. Moreover, the digital device 100 may further include such components not depicted in FIG. 3 as a housing and the like and the processor 110 can control the components shown in FIG. 3 and the components not shown in FIG. 3.

In the following description, if each step or operation performed in the digital device 100 is initiated or progressed by sensing of a user input, it is assumed that a process of generating a signal according to the sensed user input and a process of receiving the generated signal include explanation on the aforementioned process although the processes are not explained again. And, it is able to represent as the processor 100 controls the digital device 100 or at least one or more units included in the digital device 100 according to the user input. And, the processor 110 and the digital device 100 can be considered as identical to each other in the following description.

Figure 4:
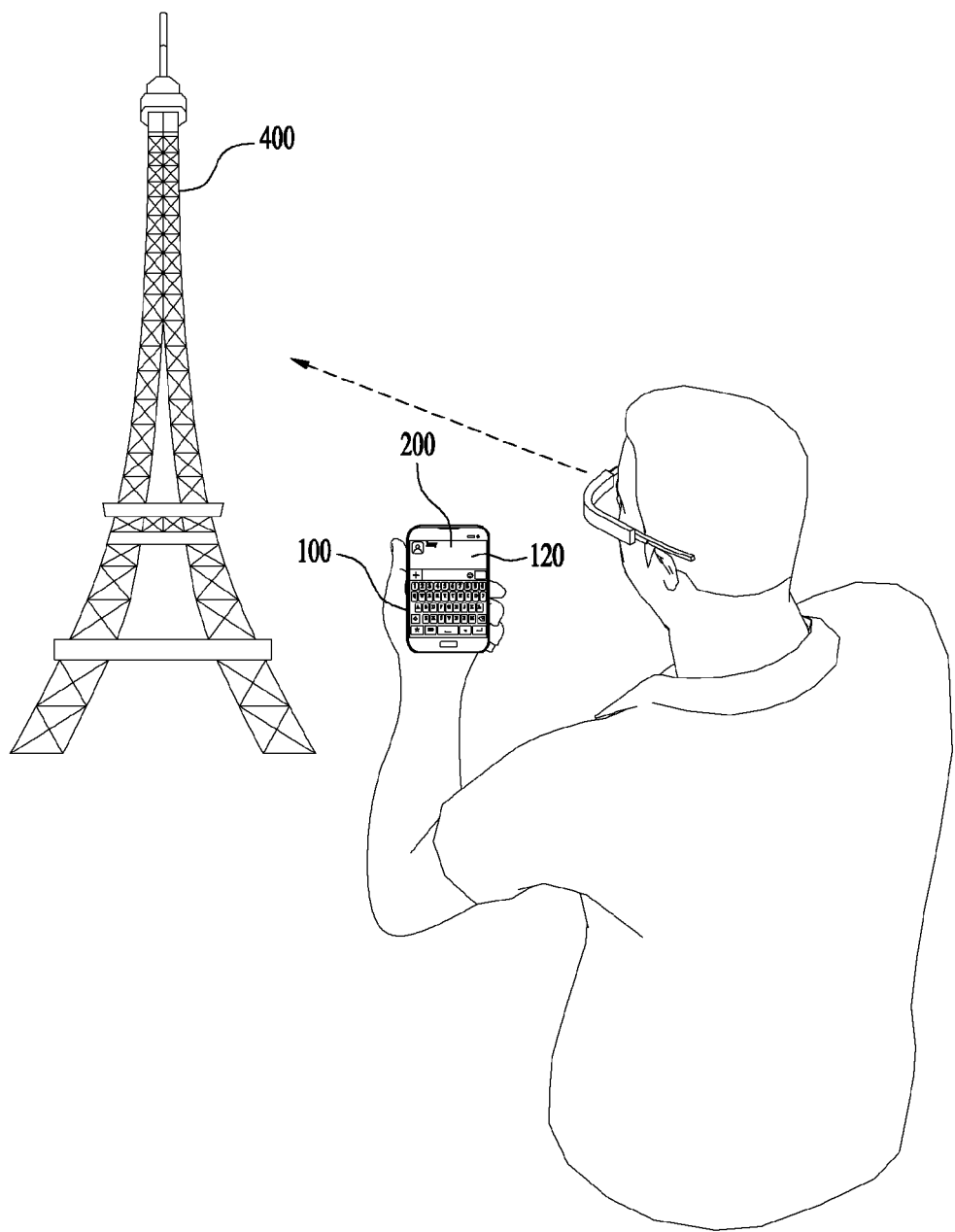
FIG. 4 is a diagram for a method of attaching a multimedia according to one embodiment.

FIG. 4 is a diagram for a method of attaching a multimedia according to one embodiment.

Referring to FIG. 4, a user of a digital device 100 is wearing a wearable device 300 of a HMD (head mounted display) type. A message input interface 200 is provided on a display unit 120 of the digital device 100. For instance, the message input interface 200 may include a receiver input and/or a virtual keyboard. The user may activate the message input interface 200 by designating a receiver in a contact list or a phone call list. And, the user may activate the message input interface 200 by executing a message application.

In FIG. 4, the user may write a message using the message input interface 200. And, the user may want to attach a picture of a landmark 400 surrounding the user to the message in the middle of writing the message. As mentioned earlier with reference to FIG. 1, when the user captures the picture of the landmark 400 using the digital device 100, the user may feel inconvenience since the user should execute a camera application to capture the picture of the landmark. Hence, the digital device 100 according to the present specification captures a picture using the wearable device 300 worn on the user and may be then able to attach the captured picture to a message.

Figure 5:
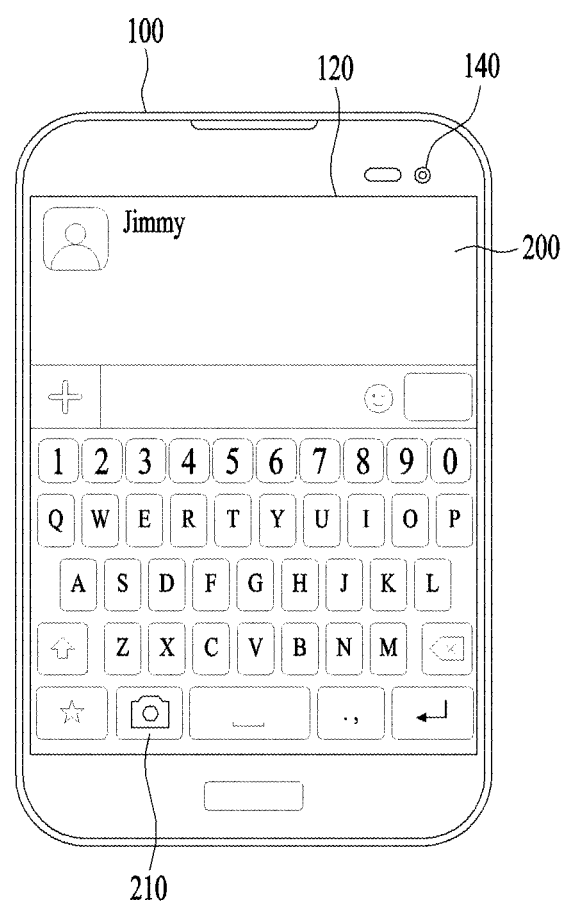
FIG. 5 is a diagram for a message input interface according to one embodiment.

FIG. 5 is a diagram for a message input interface according to one embodiment.

Referring to FIG. 5, a message input interface 200 is provided on a display unit 120 of a digital device 100. A user may activate the message input interface 200 by designating a receiver in a contact list or a phone call list. And, the user may activate the message input interface 200 by executing a message application. Referring to FIG. 5, the message input interface 200 includes a keyboard for inputting a message input and information on a receiver. And, the message input interface 200 includes a first attachment button 210.

The user may attach an image to a message by touching the first attachment button 210 included in the message input interface 200 in the middle of writing the message. In this case, the digital device 100 captures an image using a wearable device (not depicted) paired with the digital device 100 and may be then able to attach the captured image to the message being created.

And, the digital device 100 may include an image sensing unit 140 installed in the front side of the digital device 100. Yet, the digital device 100 may further include an image sensing unit (not depicted) installed in the rear side of the digital device 100.

And, the operation of the digital device 100 mentioned earlier with reference to FIG. 5 can be selectively combined with operations of the digital device 100 to be explained with reference to FIG. 6 to FIG. 9 in the following.

Figure 6:
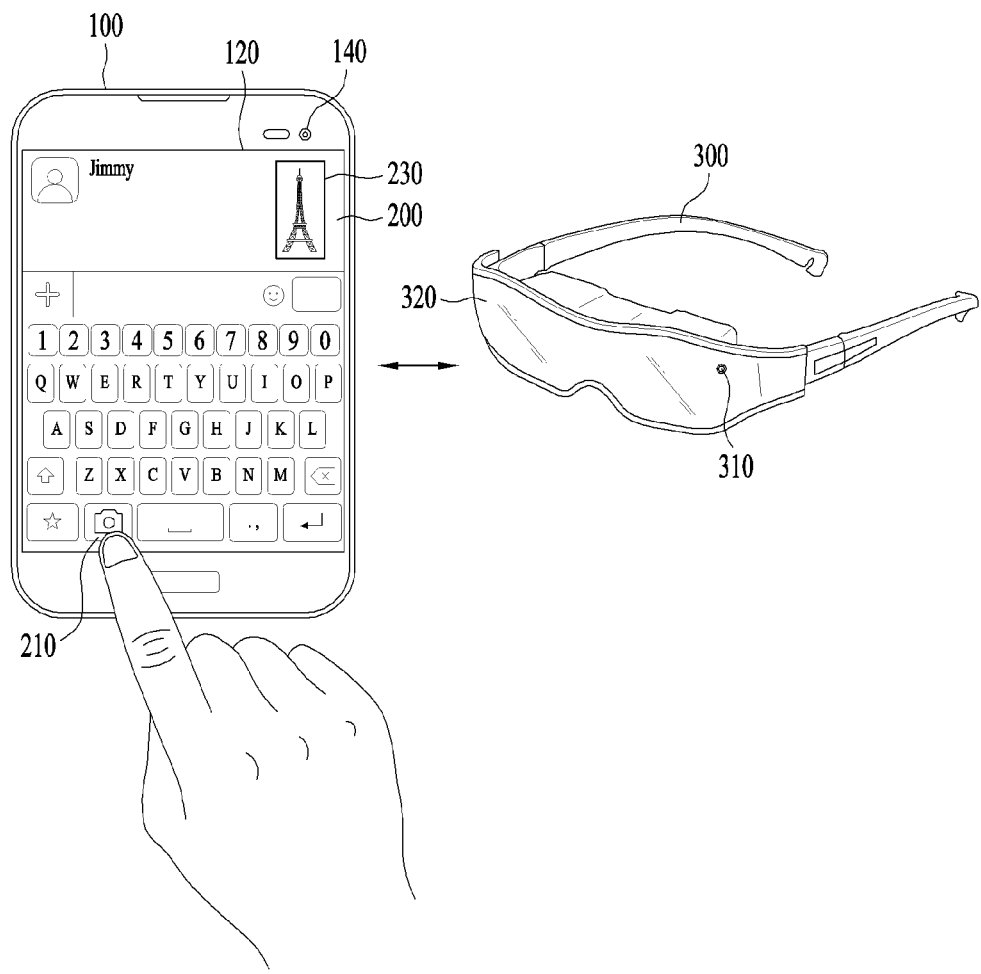
FIG. 6 is a diagram for one embodiment of attaching a multimedia based on communication between a digital device and a wearable device.

FIG. 6 is a diagram for one embodiment of attaching a multimedia based on communication between a digital device and a wearable device.

Referring to FIG. 6, a digital device 100 can be paired with a wearable device 300. For instance, the wearable device 300 may correspond to a HMD (head mounted display). The wearable device 300 may include a camera 310 and a display unit 320. Referring to FIG. 6, the digital device 100 receives an input for a first attachment button 210 from a user. The digital device 100 makes the wearable device 300 to capture an image based on the received input. For instance, the wearable device 300 may capture a landscape at which the user is looking using the camera 310. If an image is captured by the wearable device 300, the digital device 100 can attach the captured image to a message being created. The attached image 230 can be displayed on the message input interface 200.

Hence, the user makes the wearable device 300 to capture an image using the first attachment button 210 in the middle of writing a message and can attach the captured image to the message. Since a process of capturing an image captured by the wearable device 300 and attaching the captured image is automatically performed, the user can attach the captured image while message writing is not hindered. And, the user may delete the attached image 230 by performing an input for the attached image 230. And, the user may be able to capture a new image by performing an input for the first attachment button 210 again. In this case, the new image may be attached to the message instead of the previously attached image 230. And, the new image and the previously attached image 230 can be attached to the message together.

And, if an image is attached to a message, the digital device 100 may switch a mode of the message input interface 200 to an MMS (multimedia message service) mode from an SMS (short message service) mode.

And, if an image is captured in the middle of writing a message, the digital device 100 may display a preview of the captured image on a display unit 120 for predetermined time. If an image is captured, the digital device 100 may display a preview of the captured image on a display unit 320 of a wearable device 300 for predetermined time. The preview of the captured image provided by the digital device can be turned on/off by configuration of a user or selection of a manufacturer.

Meanwhile, the digital device 100 is not only able to automatically attach an image to a message, but is also able to automatically transmit the message based on an input inputted on the first attachment button 210. For instance, if an image is attached to a message, the digital device 100 can transmit the message to which the image is attached.

Meanwhile, the first attachment button 210 can be changed based on whether the wearable device 300 is paired with the digital device 100. For instance, at least one selected from the group consisting of a display size, a display color and a display shape of the first attachment button 210 can be changed based on whether the wearable device is paired with the digital device.

And, operations different from each other can be performed based on whether the wearable device 300 is paired with the digital device 100 in response to an input inputted on the first attachment button 210. For instance, when the wearable device 300 is paired with the digital device 100, if an input inputted on the first attachment button 210 is received, the digital device 100 makes the wearable device 300 to capture an image and may be then able to attach the image captured by the wearable device 300 to a message. Yet, when the wearable device 300 is not paired with the digital device 100, if the input inputted on the first attachment button 210 is received, the digital device 100 captures an image using an image sensing unit 140 installed in the front side of the digital device 100 or an image sensing unit (not depicted) installed in the rear side of the digital device and may be then able to attach the captured image to a message.

Meanwhile, the digital device 100 can attach not only an image but also a video to a message. For instance, if a touch input maintained on the first attachment button 210 less than predetermined time is received, the digital device 100 makes the wearable device 300 to capture an image and may be then able to attach the image captured by the wearable device 300 to a message. And, if a touch input maintained on the first attachment button 210 for more than the predetermined time is received, the digital device 100 makes the wearable device 300 to capture a video while the touch input is maintained and may be then able to attach the video captured by the wearable device 300 to a message.

And, the operation of the digital device 100 mentioned earlier with reference to FIG. 6 can be selectively combined with operations of the digital device 100 explained with reference to FIG. 5 and FIG. 7 to FIG. 9.

Figure 7:
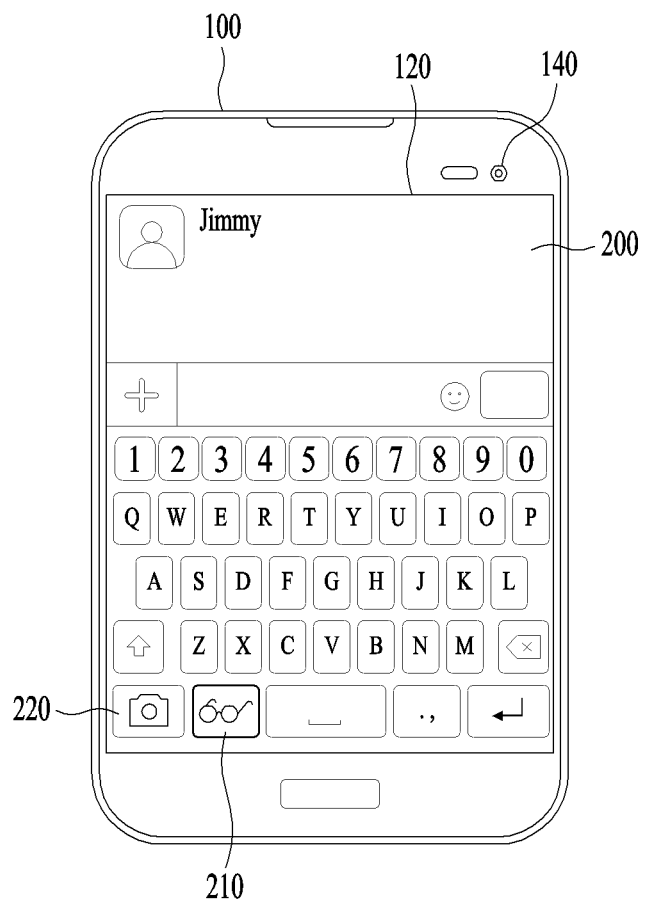
FIG. 7 is a diagram for a message input interface according to a different embodiment.

FIG. 7 is a diagram for a message input interface according to a different embodiment.

Referring to FIG. 7, a message input interface 200 includes a first attachment button 210 and a second attachment button 220. If an input inputted on the second attachment button 220 is received, a digital device 100 captures an image using an image sensing unit 140 of the digital device 100 and may be then able to attach the captured image to a message. And, if the input inputted on the second attachment button 220 is received, the digital device 100 captures an image using an image sensing unit 140 installed in the rear side of the digital device 100 and may be then able to attach the captured image to a message.

And, as mentioned earlier with reference to FIG. 5 and FIG. 6, the digital device 100 may attach an image captured by a wearable device (not depicted) to a message based on an input inputted on the first attachment button 210.

The first attachment button 210 can be displayed only when the wearable device (not depicted) is paired with the digital device 100. For instance, if the digital device 100 is not paired with the wearable device (not depicted), the digital device 100 may include the second attachment button 220 in the message input interface 200 only.

And, the operation of the digital device 100 mentioned earlier with reference to FIG. 7 can be selectively combined with operations of the digital device 100 explained with reference to FIG. 5, FIG. 6 and FIG. 8 to FIG. 9.

FIG. 8 is a diagram for one embodiment of attaching a multimedia based on gaze recognition.

Referring to FIG. 8, a digital device 100 can detect a gaze of a user using an image sensing unit 140. For instance, the digital device 100 can detect the gaze of the user by recognizing at least one selected from the group consisting of eyes of the user, pupil of the user, a face of the user and a wearable device 300 mounted on a head of the user.

Referring to FIG. 8(a), a gaze of a user is detected by the digital device 100. And, the user is writing a message using a message input interface 200 of the digital device 100.

Referring to FIG. 8(b), the user is gazing at a landmark 400 instead of the digital device 100. In this case, the gaze of the user may not be detected by the digital device 100. If the gaze of the user is not detected while a message is written, the digital device 100 captures an image using the wearable device 300 and may be then able to attach the image captured by the wearable device to the message. Hence, the user may be able to attach an image in a manner of simply gazing at an object preferred to be attached to a message via the wearable device worn on the user in the middle of writing the message.

And, as shown in FIG. 8(b), if the gaze of the user is not detected, the digital device 100 can make the wearable device 300 to capture an image. And, as shown in FIG. 8(a), if the gaze of the user is detected again after the image is captured, the digital device 100 can attach the captured image.

Meanwhile, the digital device can make the wearable device 300 to capture an image after predetermined time elapses from a moment on which the gaze of the user is not detected in the middle of writing a message.

And, if the gaze of the user is not detected, the digital device 100 can make the wearable device 300 to capture an image on every predetermined time in the middle of writing a message. In this case, two or more images can be captured by the wearable device 300. If the two or more images are captured by the wearable device 300, the digital device 100 may provide an interface used for selecting an image to be attached to a message from the two or more images.

And, in order to prevent an error, if the gaze of the user is not detected for more than predetermined time, the digital device 100 can make the wearable device 300 to capture an image.

And, the operation of the digital device 100 mentioned earlier with reference to FIG. 8 can be selectively combined with operations of the digital device 100 explained with reference to FIG. 5 to FIG. 7 and FIG. 9.

FIG. 9 is a diagram for one embodiment of attaching a multimedia based on a position of a digital device.

Referring to FIG. 9, a digital device 100 can include a location determining unit and/or a gyro sensor. Hence, the digital device 100 can sense a location of the digital device and/or acceleration for the digital device 100.

Referring to FIG. 9(a), a user is writing a message using a message input interface 200 of the digital device 100.

Referring to FIG. 9(b), the user writing the message intends to capture an image of a landmark 400 and attach the captured image to the message by raising the digital device 100. When the user raises the digital device 100, a location of the digital device 100 may be changed. Hence, if the digital device 100 moves more than a predetermined range in the middle of writing the message, the digital device 100 may automatically execute an application used for capturing an image to be attached to the message. And, if the digital device 100 moves more than the predetermined range in the middle of writing the message, the digital device 100 can automatically capture an image using an image sensing unit (not depicted) and automatically attach the captured image to the message being created. For instance, the digital device 100 may capture an image on a moment on which predetermined time elapses after the digital device 100 is moved.

And, after an image is captured, if the digital device 100 moves more than the predetermined range again, the digital device 100 may attach the captured image to the message.

The operations mentioned earlier with reference to FIGS. 9(a) and (b) can be implemented by recognizing a gesture. For instance, if a gesture of raising the digital device 100 is recognized in the middle of writing a message, the digital device 100 may capture an image to be attached to the message.

Meanwhile, the digital device 100 may capture an image based on a change of a display mode of the digital device. For instance, the digital device may change the display mode of the digital device based on a direction of gravity.

Referring to FIG. 9(a), a message input interface 200 is provided in a portrait mode. Referring to FIG. 9(b), a user writing a message holds the digital device 100 in horizontal direction. In this case, a display mode of the digital device 100 may become a landscape mode. If the display mode of the digital device switches to the landscape mode from the portrait mode or switches to the portrait mode from the landscape mode in the middle of writing a message, the digital device 100 captures an image using an image sensing unit (not depicted) of the digital device 100 and may be then able to attach the captured image to the message.

The operations of the digital device 100 mentioned earlier with reference to FIG. 9 can be selectively combined with operations of the digital device 100 explained with reference to FIG. 5 to FIG. 8.

Meanwhile, image capturing captured by a wearable device based on an input inputted on a digital device and attachment of the captured image have been explained with reference to FIG. 1 to FIG. 9 in the foregoing description. Yet, the digital device according to the present specification may capture an image and attach the captured image to a message based on an input inputted to the wearable device.

Referring back to FIG. 6, if a wearable device 300 captures an image in the middle of writing a message in a digital device 100, the digital device 100 may attach the captured image to the message.

The wearable device 300 may further include an input sensing unit configured to receive a touch input and an audio input. And, the wearable device 300 may further include a physical button configured to receive a physical input. And, for instance, the wearable device 300 may include components identical or similar to the components of the digital device mentioned earlier with reference to FIG. 2 and FIG. 3.

For instance, a user may be able to write a message using a message input interface 200 of the digital device 100. And, the digital device 100 and the wearable device 300 may be paired with each other. In this case, if an input (e.g., a touch input, an audio input and/or an input inputted on a physical button) is inputted on the wearable device 300, the wearable device 300 may capture an image using an image sensing unit 310. If an image is captured by the wearable device 300 in the middle of writing a message, the digital device 100 may attach the captured image to the message being created.

And, if an input inputted on the wearable device for more than predetermined time is received in the middle of writing a message, the wearable device 300 may capture a video while the input is received. And, the digital device 100 may attach the captured video to the message being created.

Meanwhile, as mentioned earlier with reference to FIG. 5 and FIG. 6, a message input interface 200 can be displayed based on various inputs. For instance, the message input interface 200 can be provided based on an input inputted on the wearable device 300. For instance, a user may input an address among addresses included in an address list by selecting the address from the address list or selecting a shortcut. For instance, the user may select "Jimmy" from the address list of the digital device 100 or may select a shortcut for the "Jimmy". After the "Jimmy" is selected by the user, an input inputted on the wearable device 300 can be received. And, the wearable device 300 may capture an image using a camera 310 based on the received input. If an address (e.g., "Jimmy") is selected from the address list and an image is captured based on the input inputted on the wearable device 300, the digital device 100 may provide a message input interface 200 to which the captured image is attached to the user. For instance, it is able to provide a message input interface 200 of which a receiver of a message corresponds to "Jimmy" and an image captured by the wearable device 300 is attached. In particular, an image can be automatically attached to a message based on an input inputted on the wearable device 300. And, the message input interface 200 can be provided in an MMS (multimedia message service) mode.

And, if an address is selected from an address list and an image is captured based on an input inputted on the wearable device 300, the digital device 100 may directly transmit the captured image to the selected address. In particular, the digital device 100 attaches an image to a message based on an input inputted on the wearable device 300 and may be then able to automatically transmit the message.

And, if an input inputted on the wearable device 300 is received while an input (e.g., a touch input) selecting an address from an address list or an input (e.g., a touch input) selecting a shortcut for an address on a home screen is maintained (holding), the digital device 100 makes the wearable device to capture an image and may be then able to transmit a message to which the captured image is attached to the selected address. By doing so, a user can transmit a message to which an image is attached by a single input inputted on the digital device and a single input inputted on the wearable device.

And, attachment of multimedia content which is attached based on an input inputted on the wearable device 300 can be selectively combined with the method of attaching multimedia content which is attached based on an input inputted on the digital device 100 mentioned earlier with reference to FIG. 1 to FIG. 9.

Figure 10:
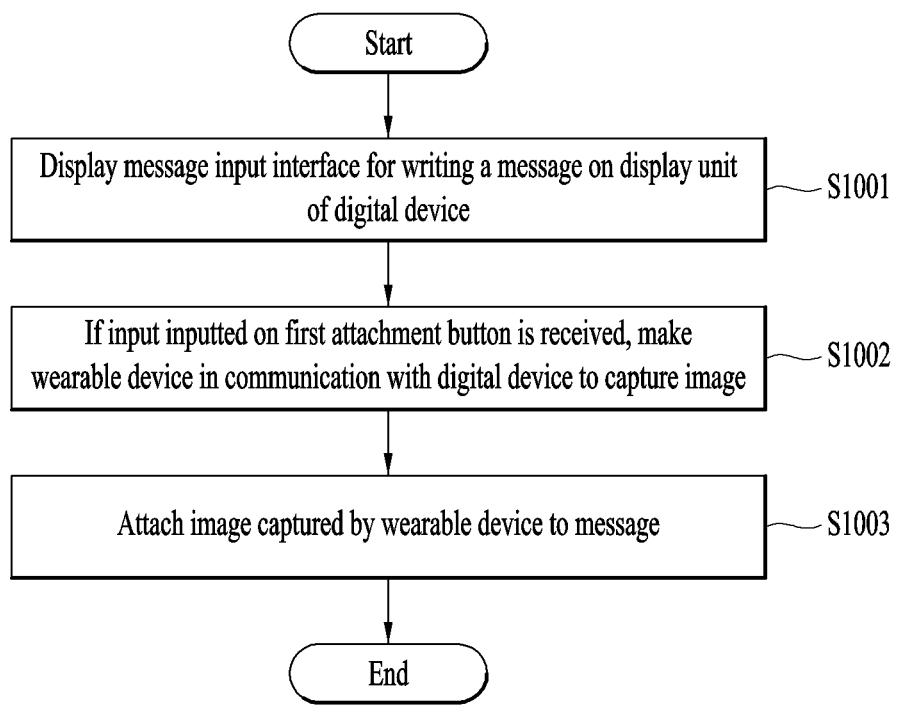
FIG. 10 is a flowchart for a method of controlling a digital device according to one embodiment.

FIG. 10 is a flowchart for a method of controlling a digital device according to one embodiment.

A digital device displays a message input interface configured to provide message writing on a display unit of the digital device [S1001]. The digital device can provide the message input interface based on various inputs. And, as mentioned earlier with reference to FIG. 5 to FIG. 7, the message input interface can include a first attachment button and/or a second attachment button.

If an input inputted on the first attachment button of the message input interface is received, the digital device can make a wearable device communicating with the digital device to capture an image [S1002]. As mentioned earlier with reference to FIG. 2 and FIG. 3, the wearable device can include a HMD (head mounted display). And, as mentioned earlier with reference to FIG. 6, an image can be captured based on an input inputted on the wearable device. As mentioned earlier with reference to FIG. 6 and FIG. 7, the digital device can attach an image captured by the digital device.

The digital device can attach an image captured by the wearable device to a message [S1003]. And, as mentioned earlier with reference to FIG. 8, the digital device can capture an image based on a gaze of a user. Moreover, as mentioned earlier with reference to FIG. 9, the digital device can capture and attach an image based on a location change of the digital device and/or a gesture.

And, the method of controlling the digital device mentioned earlier with reference to FIG. 10 can be selectively combined with the operations of the digital device mentioned earlier with reference to FIG. 1 to FIG. 9.

A display device according to the present specification and a method of controlling therefor may be not limited to a configuration and method of the aforementioned embodiments. Instead, various modifications can be achieved in a manner that all or a part of each of the embodiments is selectively combined with each other.

Meanwhile, a display device according to the present specification and a method of controlling therefor can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A digital device, comprising:
   a display unit configured to display an image and receive a touch input;
   a communication unit configured to communicate with a wearable device;
   an image sensing unit; and
   a processor configured to control the display unit, the communication unit and the image sensing unit,
   wherein the processor is further configured to:
   display a message input interface for writing a message on the display unit, wherein the message input interface comprises a first attachment button and a second attachment button,
   control the wearable device to capture a first image and attach the captured first image to the message by the wearable device if an input is inputted on the first attachment button, wherein the wearable device is different from the digital device, and
   capture a second image using the image sensing unit of the digital device and attach the captured second image to the message by the digital device if an input is inputted on the second attachment button.

2. The digital device of claim 1, wherein, if the captured first or second image is attached to the message, the processor is further configured to switch a mode of the message input interface to an MMS (multimedia message service) mode from an SMS (short message service) mode.

3. The digital device of claim 1, wherein the processor is further configured to:
   detect a gaze of a user using the image sensing unit,
   if the gaze of the user is not detected by the digital device in the middle of writing the message, control the wearable device to capture an image, and
   if the gaze of the user is detected by the digital device after the image is captured, attach the captured image to the message.

4. The digital device of claim 3, wherein if two or more images are captured by the wearable device before the message is transmitted, the processor is further configured to provide an interface for selecting an image to be attached to the message from the two or more images.

5. The digital device of claim 3, wherein if the gaze of the user is not detected by the digital device for more than a predetermined time in the middle of writing the message, the processor is further configured to control the wearable device to capture an image.

6. The digital device of claim 3, wherein the processor is further configured to detect the gaze of the user by tracking at least one of eyes of the user, pupils of the user, a face of the user and the wearable device mounted on a head of the user.

7. The digital device of claim 1, wherein the processor is further configured to:
   if a touch input inputted and maintained on the first attachment button less than a predetermined time is received, control the wearable device to capture an image and attach the image captured by the wearable device to the message, and
   if a touch input inputted and maintained on the first attachment button more than the predetermined time is received, control the wearable device to capture a video while the touch input is maintained and attach the captured video to the message.

8. The digital device of claim 1, wherein the processor is further configured to display a preview of the captured first or second image on the display unit for predetermined time.

9. The digital device of claim 1, wherein the processor is further configured to control the wearable device to display a preview of the captured first or second image on a display of the wearable device.

10. The digital device of claim 1, wherein if image capture occurs by the wearable device based on an input of a user inputted on the wearable device in the middle of writing the message, the processor is further configured to attach an image, which is captured based on the input of the user inputted on the wearable device, to the message.

11. The digital device of claim 1, wherein the processor is further configured to:
   if an input inputted on the first attachment button is received when the digital device is paired with the wearable device, control the wearable device to capture an image and attach the image captured by the wearable device to the message, and if the input inputted on the first attachment button is received when the digital device is not paired with the wearable device, capture an image using the image sensing unit of the digital device and attach the image captured by the image sensing unit to the message.

12. The digital device of claim 11, wherein the first attachment button changes at least one of a display size, a display color and a display shape based on whether the digital device is paired with the wearable device.

13. The digital device of claim 1, wherein if the captured first or second image is attached to the message, the processor is further configured to transmit the message.

14. The digital device of claim 1, wherein the wearable device corresponds to a HMD (head mounted display).

15. A method of controlling a digital device, the method comprising:
    displaying a message input interface for writing a message on a display unit of the digital device, wherein the message input interface comprises a first attachment button and a second attachment button;
    controlling a wearable device in communication with the digital device to capture a first image and attach the captured first image to the messagy the wearable device if an input is inputted on the first attachment button, wherein the wearable device is different from the digital device; and
    capturing a second image using an image sensing unit of the digital device and attaching the captured second image to the message by the digital device if an input is inputted on the second attachment button.

16. The method of claim 15, further comprising:
    detecting a gaze of a user using an image sensing unit of the digital device;
    if the gaze of the user is not detected in the middle of writing the message, controlling the wearable device to capture an image; and
    if the gaze of the user is detected by the digital device after the image is captured, attaching the captured image to the message.

17. The method of claim 15, further comprising displaying a preview of the captured first or second image on the display unit for a predetermined time.

18. The method of claim 15, wherein the wearable device corresponds to a HMD (head mounted display).

* * * * *